(12) United States Patent
Ban et al.

(10) Patent No.: US 11,487,486 B2
(45) Date of Patent: Nov. 1, 2022

(54) NON-TRANSITORY COMPUTER-READABLE RECORDING MEDIUM STORING INSTRUCTIONS AND INFORMATION PROCESSING APPARATUS FOR ARRANGING OBJECTS IN A PRINT AREA OF A PRINT MEDIA

(71) Applicant: BROTHER KOGYO KABUSHIKI KAISHA, Nagoya (JP)

(72) Inventors: Ryoji Ban, Nagoya (JP); Satoki Nagao, Ichinomiya (JP); Jun Komura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 20 days.

(21) Appl. No.: 17/118,884

(22) Filed: Dec. 11, 2020

(65) Prior Publication Data

US 2021/0182003 A1   Jun. 17, 2021

(30) Foreign Application Priority Data

Dec. 13, 2019   (JP) .............................. JP2019-225385

(51) Int. Cl.
*G06F 3/12*      (2006.01)
*H04N 1/00*      (2006.01)
*G06F 40/109*    (2020.01)

(52) U.S. Cl.
CPC .......... *G06F 3/1256* (2013.01); *G06F 3/1206* (2013.01); *G06F 3/1208* (2013.01); *G06F 40/109* (2020.01); *H04N 1/0044* (2013.01)

(58) Field of Classification Search
CPC .... G06F 3/1256; G06F 40/109; G06F 3/1206; G06F 3/1208; H04N 1/0044
See application file for complete search history.

(56) References Cited

U.S. PATENT DOCUMENTS

2011/0236104 A1*   9/2011   Takayama .............. B41J 3/4075
                                                        400/61
2016/0107453 A1*   4/2016   Ishii ..................... G06F 40/103
                                                        347/214
(Continued)

FOREIGN PATENT DOCUMENTS

JP      2009-48480 A     3/2009
JP      2016-119015 A    6/2016
JP      2019-091982 A    6/2019

*Primary Examiner* — Iriana Cruz
(74) *Attorney, Agent, or Firm* — Scully, Scott, Murphy & Presser, PC

(57) ABSTRACT

A non-transitory computer-readable recording medium stores instructions. The instructions cause the information processing apparatus to perform operations. The operations including: displaying a preview screen that indicates a print media having a certain width in a first direction; receiving a first input for designating a first object, the first object having a first object width in the first direction; disposing the first object in the preview screen; receiving a second input for designating a second object, the second object having a second object width in the first direction; comparing the second object width with a difference between the certain width and the first object width; in response to the comparing, modifying each of the first object and the second object such that sum of the first object width and the second object width corresponds to the certain width.

11 Claims, 16 Drawing Sheets

(56) References Cited

U.S. PATENT DOCUMENTS

2019/0147018 A1 5/2019 Ito et al.
2020/0223241 A1* 7/2020 Yamashita ............... B41J 29/38

* cited by examiner

NON-TRANSITORY COMPUTER-READABLE RECORDING MEDIUM STORING INSTRUCTIONS AND INFORMATION PROCESSING APPARATUS FOR ARRANGING OBJECTS IN A PRINT AREA OF A PRINT MEDIA

CROSS-REFERENCE TO RELATED APPLICATION

This application claims priority from Japanese Patent Application No. 2019-225385 filed on Dec. 13, 2019, the content of which is incorporated herein by reference in its entirety.

TECHNICAL FIELD

The present invention relates to a technique for arranging a plurality of objects in a print area.

BACKGROUND

A known information processing apparatus generates a print image in which a plurality of objects are arranged along a certain direction in a print area having a certain range. The information processing apparatus modifies a size of an existing object which has already been disposed in the print area, thereby both of the existing object and a new object which is to be disposed newly may be arranged to the print area.

SUMMARY

If the information processing apparatus modifies the size of the existing object, an appearance of the existing object may be changed, thereby an appearance of the print image may cause feeling of strangeness. The modification of the size of the existing object may also cause a margin area in the print area to be large, thereby an appearance of the print image may become worse.

One or more aspects of this disclosure are directed to a technique that may reduce an occurrence of the feeling of strangeness or becoming worse of the print image.

According to one or more aspects of disclosure, a non-transitory computer-readable recording medium stores instructions. The instructions, when executed by a computer of an information processing apparatus, cause the information processing apparatus to perform operations. The operations include: displaying a preview screen that indicates a print media having a certain width in a first direction; receiving a first input for designating a first object, the first object having a first object width in the first direction; disposing the first object in the preview screen; receiving a second input for designating a second object, the second object having a second object width in the first direction; comparing the second object width with a difference between the certain width and the first object width; in response to the comparing, modifying each of the first object and the second object such that sum of the first object width and the second object width corresponds to the certain width.

According to the above configuration, each of the first object and the second object is modified in the first direction such that sum of the first object width and the second object width corresponds to the certain width of the print image in the first direction. Thus, the occurrence of feeling of strangeness or becoming worse may be reduced.

According to one or more aspects of disclosure, a non-transitory computer-readable recording medium stores instructions. The instructions, when executed by a computer of an information processing apparatus, cause the information processing apparatus to perform operations. The operations include: displaying a preview screen that indicates a print media having a certain width in a first direction and a certain height in a second direction different from the first direction; receiving a first input for designating a first text object, the first text object having a first font size, a first object width in the first direction and a first object height in the second direction; receiving a second input for designating a second text object, the second text object having a second font size, a second object width in the first direction and a second object height in the second direction; modifying at least one of the first object or the second object, such that sum of the first object height and the second object height corresponds to the certain height, and such that a ratio of the first font size to the second font size before modifying is identical to a ratio of the first font size to the second font size after modifying; and disposing, after the modifying, the first text object and the second text object in the second direction in the preview screen.

According to the above configuration, at least one of the first object or the second object is modified, such that sum of the first object height and the second object height corresponds to the certain height, and such that a ratio of the first font size to the second font size before modifying is identical to a ratio of the first font size to the second font size after modifying. Thus, the occurrence of feeling of strangeness or becoming worse may be reduced.

The above configuration may be implemented by another apparatus, such as information processing device.

DETAILED DESCRIPTION

Figure 1:
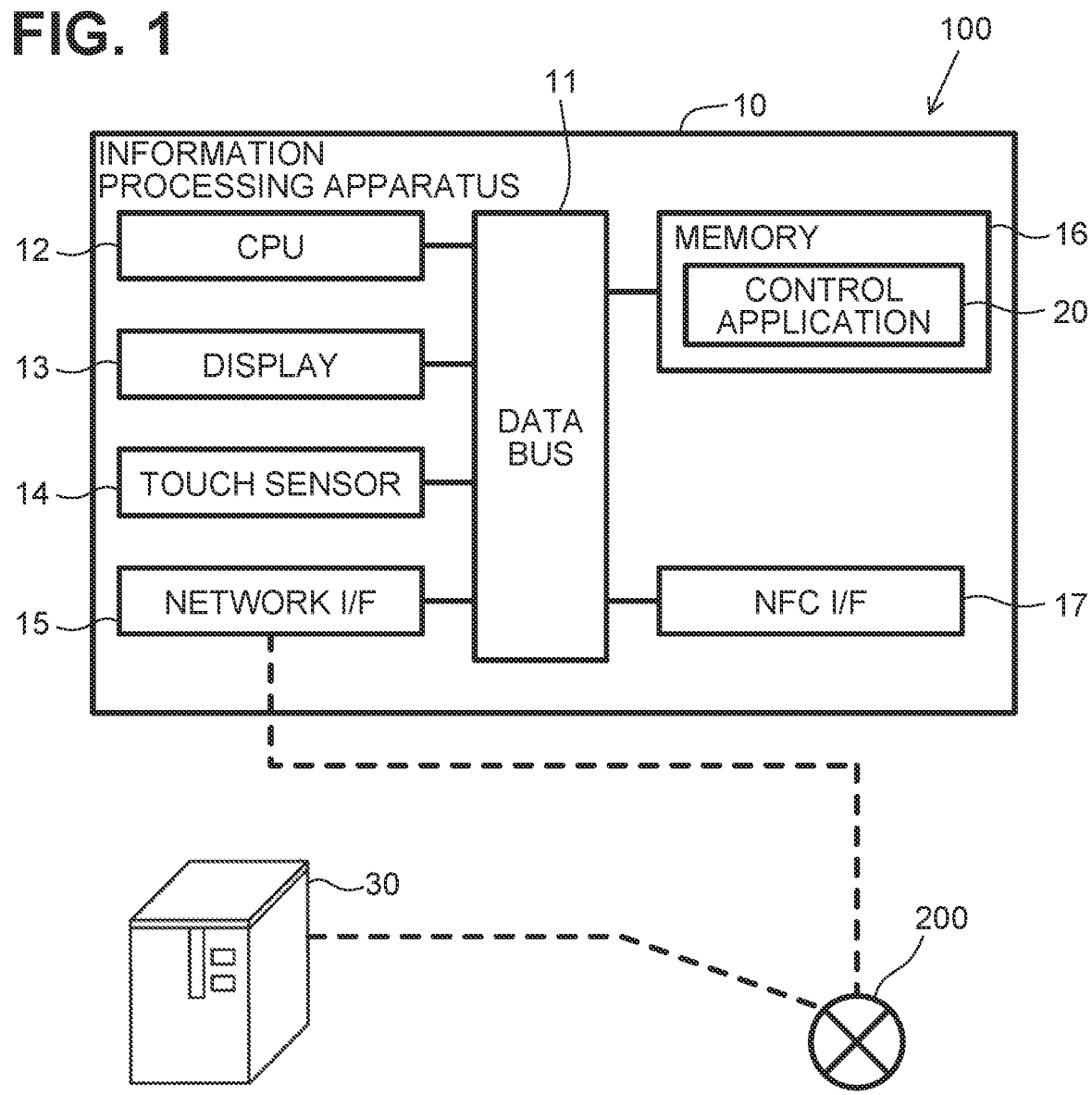
FIG. 1 is a configuration diagram of a printing system.

Hereinafter, a printing system according to a first embodiment will be described in detail with reference to the drawings. As illustrated in FIG. 1, a printing system 100 includes an information processing apparatus 10, and a printer 30.

The information processing apparatus 10 and the printer 30 are connected to a network 200. In this embodiment, the network 200 may be the Internet, a Local Area Network (hereinafter, abbreviated to "LAN") or a combination of the Internet and the LAN. The network 200 may be a wired network, a wireless network, or a combination of a wired network and a wireless network. The information processing apparatus 10 and the printer 30 are connected wirelessly through a router that is a component of the network 200.

The printer 30 is configured to print a print image on a print medium (e.g., a tape). The print image includes one or more objects, such as a text, an icon, and a code. The code may include, but not limited to, a one-dimensional code such as a barcode, or a two-dimensional code such as a QR Code that is a registered trademark of Denso Wave Incorporated. In this embodiment, the printer 30 is configured to eject ink on an elongate tape to print a print image. Alternatively, the printer 30 may have a printing engine such as a thermal transfer mechanism which thermally prints an object on a heat-sensitive tape.

The information processing apparatus 10 may be a terminal device, such as a smartphone or a tablet. The information processing apparatus 10 includes a data bus 11, a CPU (abbreviation for Central Processing Unit) 12, a display 13, a network IF (abbreviation for Interface) 15, a memory 16, and an NFC (abbreviation for Near Field Communication) IF 17. The display 13 includes a touch screen function. These elements are connected communicable with each other via the data bus 11.

The display 13 includes a screen surface on which an image is displayed. The display 13 includes a touch sensor 14 disposed over the screen surface of the display 13. The touch sensor 14 is configured to detect approaching or contacting of user's finger or a stylus, and, in response to the detection, outputs an electrical signal. Hereinafter, an operation on the touch sensor 14 of the display 13 is also referred to as a user's operation. In this embodiment, the display 13 with the touch sensor 14 is an example of an "operation unit". Alternatively, the information processing apparatus 10 may include, as the operation unit, physical keys.

The network IF 15 is an interface for executing wireless communication in conformity with Wi-Fi standard based on the IEEE 802.11 standard or equivalent thereof. The Wi-Fi standard is a registered trademark of Wi-Fi Alliance. The NFC IF 17 is an interface for executing wireless communication in conformity with NFC standard. The information processing apparatus 10 is wirelessly communicable with the printer 30 via the network IF 15 or the NFC IF 17. Alternatively, the network IF 15 may be in conformity with communication scheme for short-range wireless communication, such as, Bluetooth for communicating with the printer 30. Bluetooth is a registered trademark of BLUETOOTH SIG, INC.

The memory 16 may include a random access memory (hereinafter abbreviated to "RAM"), a read-only memory (hereinafter abbreviated to "ROM"), a flash memory, or a combination thereof. The memory 16 may be a computer-readable recording medium. The computer-readable recording medium may also be a CD-ROM or a DVD-ROM.

The memory 16 stores a client Operating System (hereinafter abbreviated to "OS") (not shown in the figures) and a control application 20 (hereinafter abbreviated to "control AP 20"). The CPU 12 causes the printer 30 to print, by launching the control AP 20 under the control of the client OS. The memory 16 stores variety of data referred while the CPU 12 performs according to the control AP 20. In this embodiment, the control AP 20 is an example of "control program".

In this embodiment, basically, the following processes and each step in the flowchart indicate processes by the CPU 12 in accordance with instructions in one or more programs. Processes, such as "determine", "calculate", "specify", and "receive", represent processes executed by the CPU 12. The processes executed by the CPU 12 may include controlling a hardware. In this embodiment, "data" may be represented by a bit stream readable by a computer. In this embodiment, just a difference in data format may not mean a different data. Thus, it would be said that two pieces of data having same information in different format are the same. The treatment of "information" is the same as that of "data".

In response to launching the control AP 20, a top screen (not shown in figures) is displayed on the display 13. In response to user's selection of a print function at a top screen, the CPU 12 displays an edit screen 40 illustrated in FIG. 2. The edit screen 40 is for generating a print image. The edit screen 40 includes an image display area 41, an object display area 42, a keyboard image 43, and a done button 44.

Figure 2:
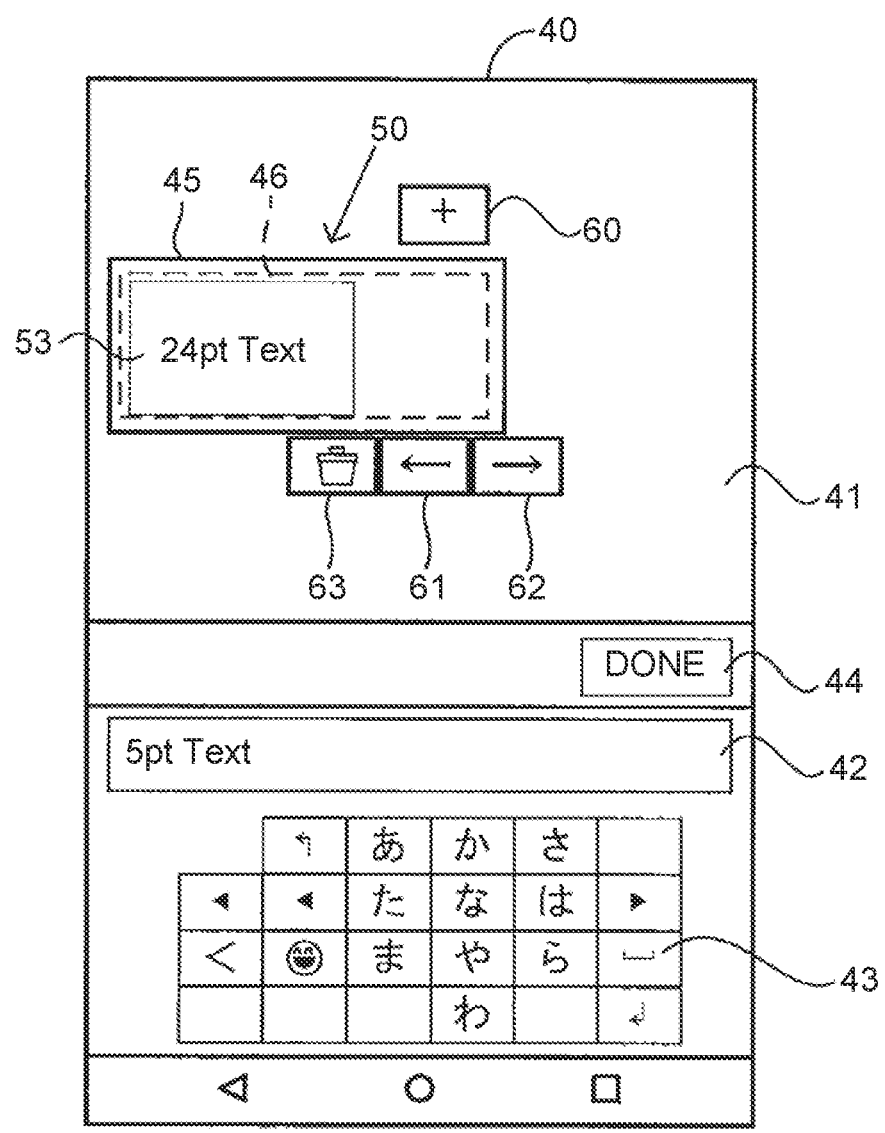
FIG. 2 is a diagram illustrating an editing screen.

The CPU 12 displays, in the image display area 41, a background image 45, an addition icon 60, moving icons 61 and 62, and a delete icon 63. The background image 45 represents a tape on which a print image is configured to be printed by the printer 30. A print area 46 is configured to be set in the background image 45. The print area 46, which is indicated by a dashed line in FIG. 2, is disposed inside the outer edge of the background image 45. The print area 46 is an area in which the disposed image is printable. Each of the background image 45 and the print area 46 has a length in accordance with a sheet size based on a print setting. Alternatively, the length may be set regardless of the sheet size. An area between outer edge of the background image 45 and outer edge of the print area 46 is defined as a margin area. The printer 30 is configured not to print an image in the margin area. The CPU 12 displays the print image 50 such that the print image 50 is disposed in the print area 46.

In the object display area 42, one or more objects of the print image 50 are displayed. The keyboard image 43 includes one or more key images for receiving user's touch operation. The CPU 12 receives the user's operation for corresponding key image in the keyboard image 43 through the display 13. In response to the user's operation to the keyboard image 43, the CPU 12 enables displaying one or more objects in the object display area 42, or editing the displayed objects. The user may touch the done button 44 when editing the objects is completed. In response to operation of the done button 44, the object in the object display area 42 is displayed at the print area 46 in the image display area 41.

In response to the user's input through the keyboard image 43, the CPU 12 displays the inputted objects in the object display area 42. The CPU 12 may change an object setting in response to a user's instruction. For example, the CPU 12 may change a font size, a font type, or a font color of the text. In an example of FIG. 2 where an object 53 of "24 pt Text" in the print area 46 is selected, in response to user's operation of the done button 44, the CPU 12 displays, in the print area 46, a text of "5 pt Text", which is displayed in the object display area 42, such that the object 53 of "24 pt Text" is replaced with the object of "5 pt Text". The user may select a certain object 53 in the print area 46 by touching the display 13 using the user's finger or the stylus.

The CPU 12 may arrange a plurality of objects in the print area 46 by adding an object displayed in the object display area 42 to the print area 46, in response to receiving the user's operation of the addition icon 60. In response to the user's operation of the addition icon 60, the CPU 12 displays an object selection screen in place of the keyboard image 43. The object selection screen is for selecting a type of object. The type of object may include, but not limited to, a text, an image, a symbol, or a 2D or 3D code. In response to receiving user's instruction for selecting the type of object among a plurality of types of objects, the CPU 12 displays an image for inputting contents of the selected type of object. For example, if the selected type of object is a text, the CPU 12 displays the keyboard image 43. In response to user's operation using the keyboard image 43 for inputting one or more characters and user's operation of the done button 44, the CPU 12 displays a new object of inputted characters in the print area 46. For another example, if the selected type of object is an image, the CPU 12 displays an image for designating a storage area in which a plurality of image data is stored. Thus, the plurality of objects may be arranged in the print area 46. Activating the moving icons 61 and 62 in the image display area 41 causes changing a position of arranged objects in the print area 46. Activating the delete icon 63 in the image display area 41 causes deleting an object already displayed in the print area 46.

The CPU 12 sends, to the printer 30, a print instruction for printing a print image displayed in the image display unit 41 in response to user's instruction of a print execution button. The CPU 12 generates a print job corresponding to the print image 50, and sends the generated print job to the printer 30. The CPU 12 executes a setting process using a setting screen for setting the print process in response to user's instruction. For example, the CPU 12 sets a sheet size of a print medium or a printer to which the print job is to be sent in the setting process.

Figure 3:
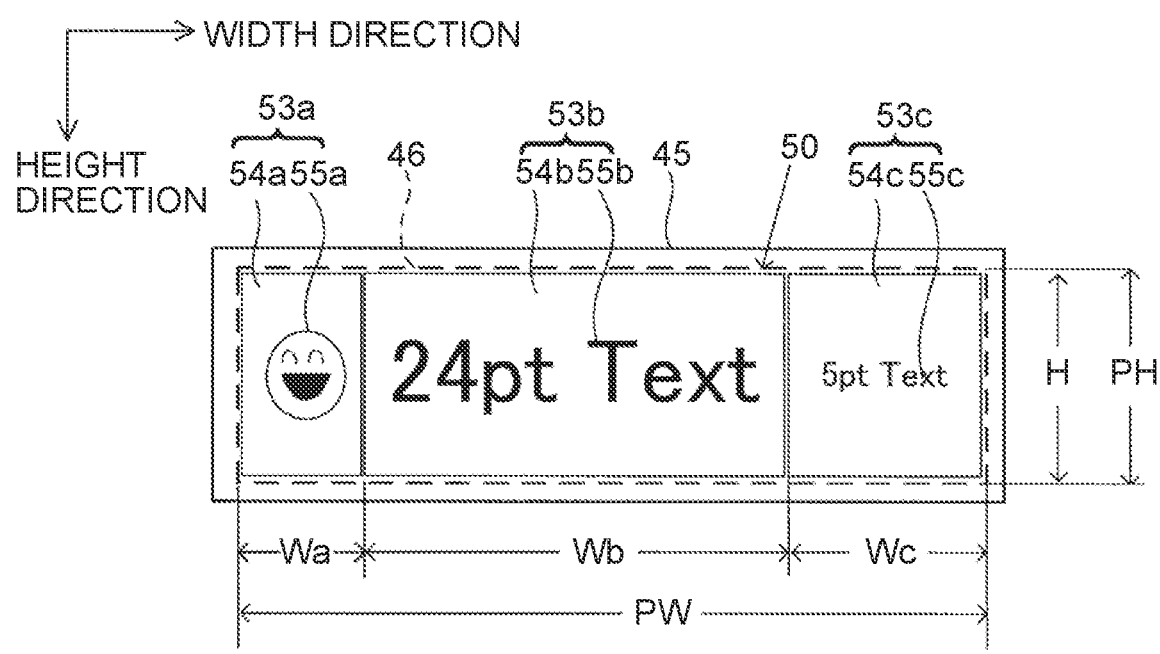
FIG. 3 is a diagram illustrating a print image.

Referring to FIG. 3, a print image 50 displayed in the image display area 41 will be described. Hereinafter, a direction in which an edge of the print area 46 extending longitudinally may be defined as a width direction, and a direction in which an edge of the print area 46 extending orthogonal to the width direction may be defined as a height direction. A length in the width direction may be defined as a width, and a length in the height direction may be defined as a height. In this embodiment, the width direction is an example of the "first direction", and the height direction is an example of the "second direction". Hereinafter, "object 53" is used as a general term and not used for a specific object. "Object 53a", "object 53b", or "object 53c" may be used to describe each object.

In FIG. 3, the print image 50 includes three objects 53a, 53b, and 53c arranged along the width direction in the print area 46. The object 53 includes an object area 54 and a content 55. The object area 54 is a rectangle area extending in each of the width direction and the height direction. The content 55 may include an attribute and data. The attribute may be a type of object including, such as a text, a symbol, or a code. In the present embodiment, the object 53a includes a content 55a of a symbol object indicating a symbol of certain data. Each of objects 53b and 53c includes a content 55b and 55c, respectively, of a text in which certain data of character string is arranged in the width direction.

The CPU 12 sets an initial size (initial width W, initial height H, and initial content size) of the object 53 to be disposed in the print area 46 in response to user's operation of the done button 44. Specifically, the CPU 12 sets the initial height H of an object such that the initial height H is identical to a height PH of the print area 46. Next, the CPU 12 sets the initial content size to a size instructed by a user. If the initial content size, which is the user's instructed size, is greater than a maximum size within the initial height H, the initial content size is modified such that the initial content size is identical to the maximum size. If the attribute of the object 53 is a text, the initial content size is set to a font size of the text. Then, the CPU 12 sets the initial width W of the object 53 based on the initial content size. If the attribute of the object 53 is the text, the CPU 12 sets the initial width W based on the number of characters and a font size of each character. In FIG. 3, a certain margin area is set between the objects 53a and 53b and between the objects 53b and 53c. Nevertheless, the margin areas may not be set.

When the CPU 12 attempts to arrange a plurality of objects 53 each of which is in an initial size along the width direction on the print area 46, at least one of the objects 53 may not be capable of being disposed within the print area 46, or a margin area in the print area 46 may be large. In a case where the three objects 53a, 53b and 53c each of which is in the initial size are arranged in the print area 46 as described in FIG. 4, and the objects 53a has a width Wa, the object 53b has a width Wb, and the object 53c has a width Wc, a total width SW (i.e., sum of Wa+Wb+Wc) exceeds a width PW of the print area 46, thereby a part of the object 53c is not disposed within the print area 46. In another case where the three objects 53a, 53b and 53c each of which is in the initial size are arranged in the print area 46 as described in FIG. 5, and the object 53a has a width Wa, the object 53b has a width Wb, and the object 53c has a width Wc, the total width SW is quite less than the width PW of the print area 46, thereby a relatively large margin area may be disposed between right end of the object 53c and right end of the print area 46. In either case, an appearance of the print image may be unacceptable.

In this embodiment, in a case where the plurality of objects are arranged along the width direction in the print area 46, the CPU 12 modifies the width W of each object in the width direction in accordance with the width PW of the print area 46 while keeping acceptable appearance.

Figure 4:
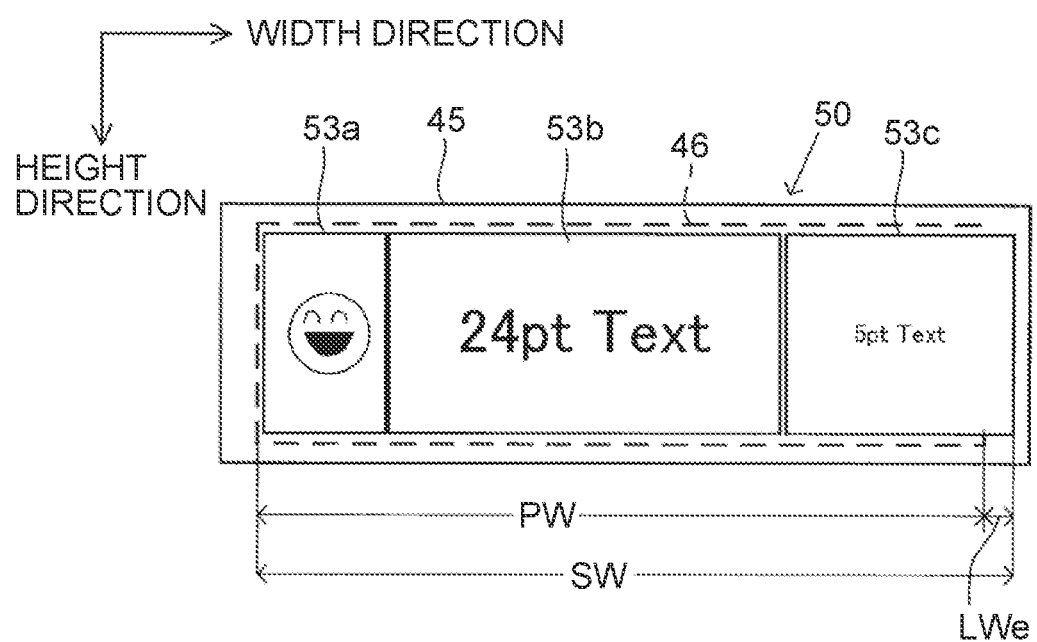
FIG. 4 is a diagram illustrating a print image.
Figure 5:
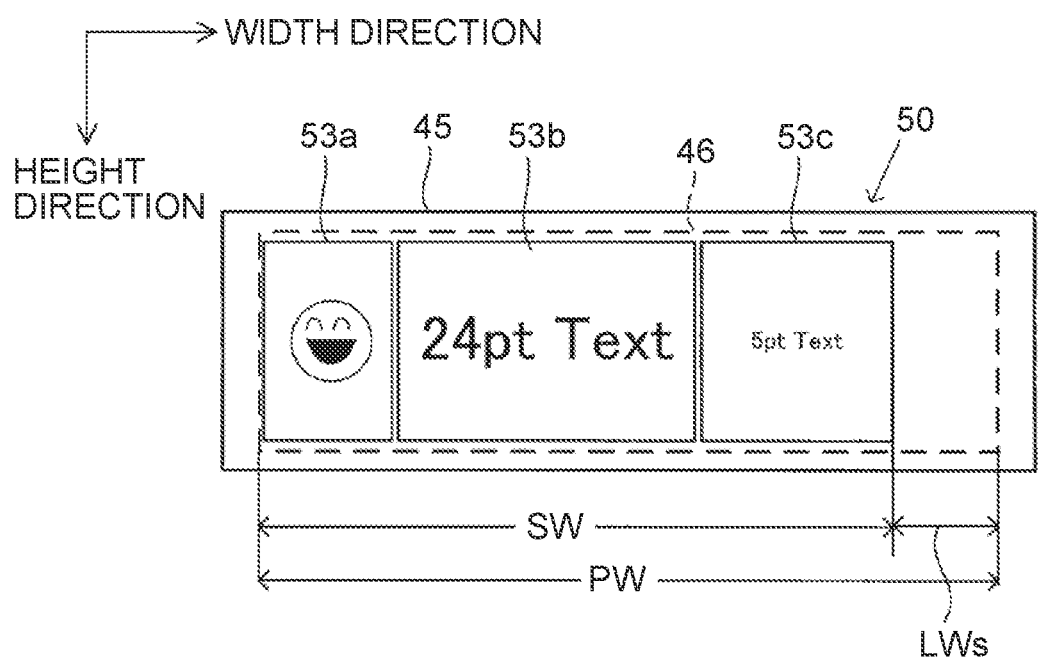
FIG. 5 is a diagram illustrating a print image.

Referring to each FIGS. 4 and 5 illustrating an example of arrangement of object 53a, object 53b and object 53c in the print area 46, a process of arrangement of the object 53 will be described. Processes of FIG. 6 starts in response to a selection of a print function at the top screen on the display 13.

In S10, the CPU 12 displays the edit screen 40 on the display 13. In S11, the CPU 12 determines whether the done button 44 has been operated in the edit screen 40. In S11, the CPU 12 further determines whether the delete icon 63 has been operated, and whether at least one object remains in the object display area 42 in response to the operation of the delete icon 63. In a case where it is determined that (1) the done button 44 has not been operated or (2) no object remains in the object display area 42 in response to operating the delete icon 63 (S11 NO), the CPU 12 skips S12, S13, S14 and S24, and proceeds to S25 to wait for receiving a print instruction. In response to user's operation of the done button 44, or at least one object remaining in response to the operation of the delete icon 63, the CPU proceeds to S12.

In S12, the CPU 12 stores information of an initial size of the object 53 displayed in the object display area 42 into the memory 16. The information of the initial size may include initial width W and initial height H of the object. In a case where the type of object is a text, the information of the initial size may further include font size of the text. Nevertheless, in a case where the type of object is the text, the CPU 12 may only store the information of the font size of the text without storing the information of the initial width W and the initial height H.

In S13, the CPU 12 determines whether setting of "auto" has been selected as the print setting. Selecting the setting of "auto" causes the CPU 12 to automatically modify the width PW of the print area 46 in accordance with the total width SW. The setting of the "auto" is configured to be switched between ON and OFF.

In a case it is determined that the "auto" has been selected, in S14, the CPU 12 modifies the width PW of the print area 46 such that the width PW is identical to the total width SW. In S24, the CPU 12 arranges one or more objects 53 in the print area 46 having the modified width PW without changing the width, the height, or the font size, if any, of the objects 53. In S25, the CPU 12 determines whether a print instruction for the print image 50 is received. In a case where it is determined that the print instruction is not received, the CPU 12 goes back to S11, and waits to receive operation of either the done button 44 or the delete icon 63. For example, in a case where a new object 53b is to be added in S11 in response to user's operation of the done button 44 and where the "auto" is selected, in S14, the CPU 12 modifies the width PW of the print area 46 to be expanded in accordance with the total width SW. The total width SW in this example is sum of an initial width W of existing object 53a and an initial width W of the new object 53b. This modification allows the two objects 53a and 53b to be arranged without being overlapped with each other.

Hereinafter, an example, in which a new object 53c is to be added in a state where two objects 53a and 53b have already been arranged in the print area 46, will be described.

In a case where it is determined that the setting of "auto" is not selected (NO in S13), the CPU 12 proceeds to S15. In S15, the CPU 12 determines whether the width PW of the print area 46 is less than the total width SW (i.e., sum of initial width W of each object 53a, 53b and 53c).

In a case where it is determined that the width PW of the print area 46 is less than the total width SW (that is, it is determined that a part of at least one of objects 53 is disposed beyond the print area 46), the CPU 12 proceeds to S16. In S16, the CPU 12 calculates a width LWe. As illustrated in FIG. 4, the width LWe, which is a partial width of the object 53, represents a width beyond the print area 46 in the width direction. In this embodiment, the width LWe is calculated by subtracting the width PW from the total width SW (i.e., SW−PW). Alternatively, the width LWe may calculated in consideration of a margin area between each object 53, which may be calculated as "SW+(N−1)×MW−PW", where N is the number of arranged objects 53 and MW is a certain width of a margin area set between each object. The margin area set between each object is identical to each other.

Figure 7:
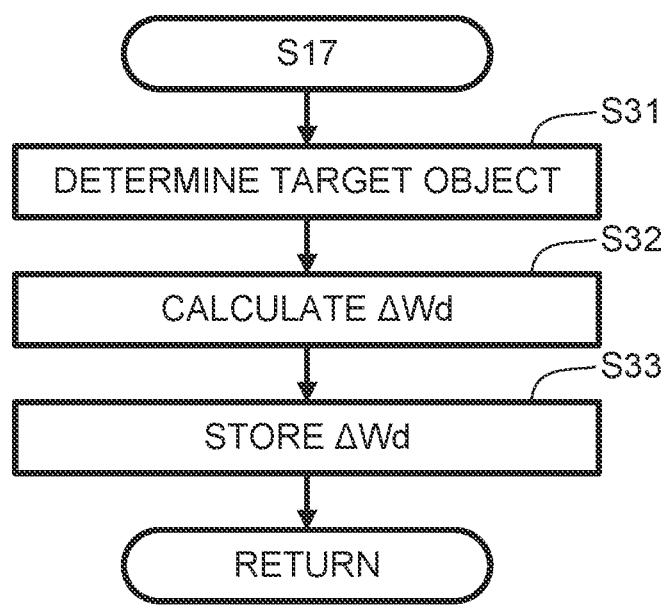
FIG. 7 is a flowchart illustrating processes executed in step S17 of FIG. 6.

In S17, the CPU 12 calculates a reduction amount ΔWd by using the calculated length LWe. The reduction amount ΔWd indicates a reduction amount of width W of each object 53. FIG. 7 is a flowchart of detailed processes to be executed in S17.

In S31, the CPU 12 determines a target object having a width W to be modified. The target object is determined among the arranged objects in the print area 46. In this embodiment, each text object of 53b and 53c is determined as the target object. In other words, an object 53 having a content 55 of either a symbol, an image, or a code is not determined as the target object.

In S32, the CPU 12 calculates the reduction amount ΔWd of each target object in accordance with the length LWe, and a ratio of width Wb of the target object 53b to the width Wc of the target object 53c. Each of a reduction amount ΔWdb of the target object 53b and a reduction amount ΔWdc of the target object 53c is calculated such that (1) a ratio of the width Wb of the target object 53b to the width Wc of the target objects 53c after the calculation is identical to an initial ratio of the width Wb of the target object 53b to the width Wc of the target objects 53c before the calculation, and (2) a sum of the reduction amount ΔWdb and the reduction amount ΔWdc is identical to the width LWe.

In this embodiment, the reduction amount ΔWd is calculated by the following equation (1).

$$\Delta Wd(n) = LWe \times Wn / \Sigma Wt \quad (1)$$

Where "n" is an identifier for identifying object 53, and, in this embodiment, "b" or "c". $\Sigma Wt$ is sum of the initial width W of each target object. In the case of FIG. 4, $\Sigma Wt$ is sum of the width Wb of the object 53b and the width Wc of the object 53c.

In S33, the CPU 12 stores calculated reduction amount ΔWd in association with corresponding target object. In this embodiment, the CPU 12 stores the calculated reduction amount ΔWdb for the object 53b and the calculated reduction amount ΔWdc for the object 53c. The CPU 12 determines a zero value of the reduction amount ΔWda for the object 53a because the object 53a is non-target object. Upon completion of S33, the CPU 12 proceeds to S18 of FIG. 6.

In S18, the CPU 12 reduces the width W of each target object by using the reduction amount ΔWd calculated in S17. The modified width W of object area 54 is calculated by subtracting ΔW from the initial width W of the target object (i.e., W−ΔW). In this embodiment, the modified width Wa of object area 54a equals to the initial width Wa. The modified width Wb of object area 54b is calculated by subtracting ΔWdb from the initial width Wb of the target object 53b (i.e., Wb−ΔWdb). The modified width Wc of object area 54c is calculated by subtracting ΔWdc from the initial width Wc of the target object 53b (i.e., Wc−ΔWdc)

In S19, the CPU 12 determines whether font size of at least one of the objects 53 is to be decreased in accordance with the reduction of the width W. For example, in a case where the reduced width W is less than a width necessary for arranging the character string of the object 53 with a current font size, the CPU 12 determines that the font size is to be decreased. Accordingly, a case in which a part of text is not displayed due to a large font size may be suppressed.

In a case where it is determined that the font size of at least one of the objects 53 is to be decreased (YES in S19), in S20, the CPU 12 decreases font size of corresponding object in accordance with the reduced width W. The CPU 12 stores the decreased font size into the memory 16 in addition to an initial font size. In a case where it is determined that the font size of at least one of the objects 53 is not to be decreased (NO in S19), or in response to execution of process in S20, the CPU 12 proceeds to S24.

In a case where it is determined that the width PW of the print area 46 is not less than the total width SW (that is, all of the objects 53 are disposed in the print area 46) (NO in S15), the CPU 12 proceeds to S21.

In S21, the CPU 12 calculates a width LWs. As illustrated in FIG. 5, the width LWs represents a width between a right side end of the object 53 which is disposed lastly (i.e., object 53c) and a right side end of the print area 46. In this embodiment, the width LWs is calculated by subtracting the total width SW from the width PW of the print area 46 (i.e., PW−SW). In a case where the width PW is identical to the total width SW, the width LWs is zero.

Figure 8:
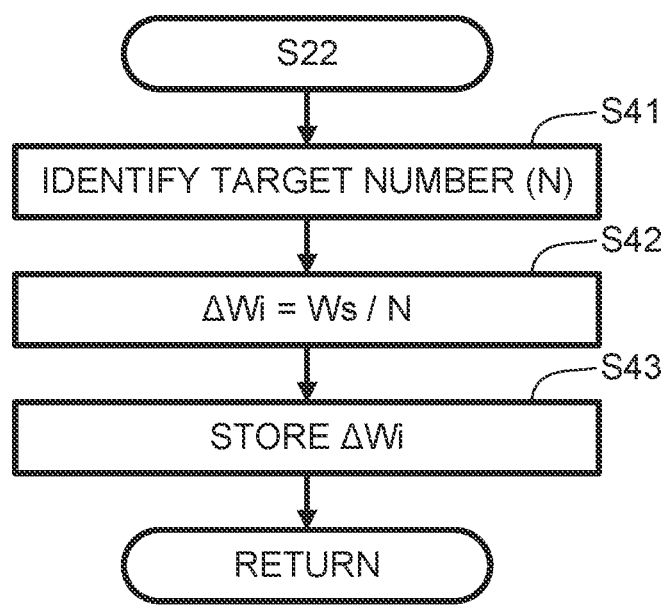
FIG. 8 is a flowchart illustrating processes executed in step S22 of FIG. 6.

In S22, the CPU 12 calculates an expansion amount ΔWi by using width LWs calculated at S21. The expansion amount ΔWi indicates an expansion amount of width W of each object 53. FIG. 8 is a flowchart of detailed processes to be executed in S22. In S41, the CPU 12 identifies a target number N representing the number of target objects. In this embodiment, a text object is determined as the target object as mentioned above. In the case of FIG. 5, the objects 53b and 53c are determined as the target object, thereby the CPU 12 identifies "2" as the target number N.

In S42, the CPU 12 calculates the expansion amount ΔWi. In this embodiment, the expansion amount ΔWi is calculated by dividing the length LWs by the target number N (i.e., LWs/N).

In S43, the CPU 12 stores the calculated expansion amount ΔWi into the memory 16 in association with the corresponding object 53. Then, the CPU 12 proceeds to S23 of FIG. 6.

Figure 6:
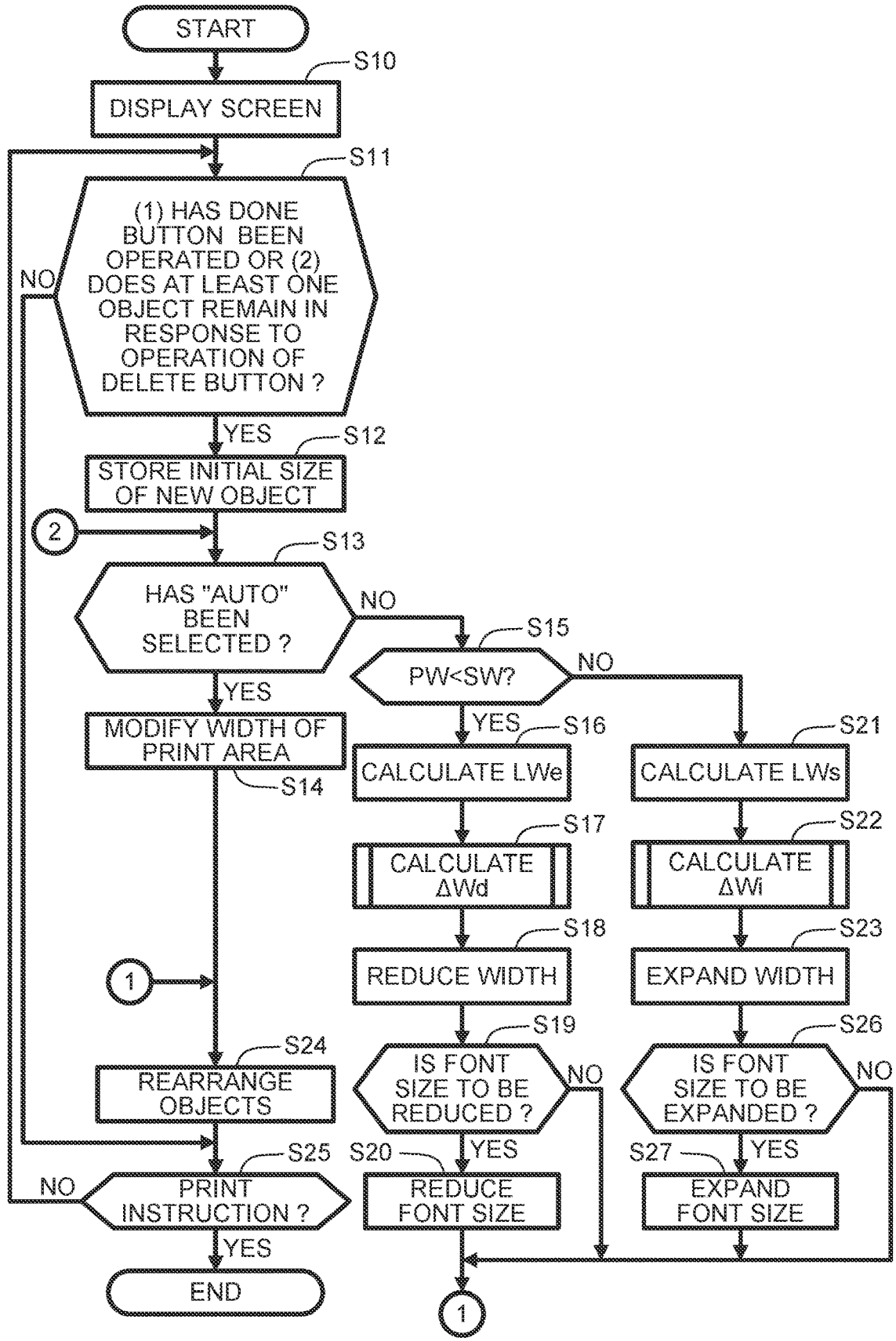
FIG. 6 is a flowchart illustrating steps of arranging a plurality of objects in a print area.

In S23 of FIG. 6, the CPU 12 expands the width W of each object 53 by using the expansion amount ΔWi calculated at S22. The expanded width W of object area 54 of the text object is calculated to sum of the initial width W and the expanded amount ΔWi while font size of text (i.e., the content 55) is maintained. In the case of FIG. 5, the expanded width Wb of object area 54b of the target object 53b is sum of initial width Wb and ΔWi, and the expanded width Wc of object area 54c of the target object 53c is sum of initial width Wc and ΔWi. Thus, only a margin area between each character is configured to be expanded in the print area 46, thereby the appearance of text may be maintained.

In S26, the CPU 12 determines whether font size of text of each object 53 is to be increased in accordance with the expanded width W. Following scenario may be a case that font size of the certain text object is determined to be increased in response to expanding the width W: in S20 the font size of a certain text object is decreased due to adding a new object in the print area 46; then, in S11 at least one object other than the certain text object is deleted; and then, in S26 the certain text object is determined to be expanded.

In a case where it is determined that the font size is to be increased (YES in S26), in S27, the CPU 12 increases the font size in accordance with the expanded width W, and stores the increased font size into the memory 16 in addition to the initial font size. In response to determination of the font size being not to be increased in S26, or in response to execution of S27, the CPU 12 proceeds to S24.

In S24, the CPU 12 rearranges each object 53, of which the width W has been expanded or reduced, in accordance with the width PW of the print area 46. Each object 53 is arranged in the width direction such that object area 54 of each object is not overlapped with each other. A new object is arranged at a right side of one or more existing objects which have been displayed in the print area 46.

The object 53b is an example of the "first object". The object 53c is an example of the "second object".

According to this embodiment, following effects may be obtained. The CPU 12 of the information processing apparatus 10 displays print area 46 on the display 13. The print area 46 has a fixed width PW (an example of "certain width") in the width direction. In a case where a plurality of objects 53 are arranged in the print area 46 in the width direction, the CPU 12 modifies a width of each object 53 such that the total width SW which is sum of the width of each object 53 is identical to the width PW of the print area 46 (i.e., the CPU 12 modifies a width of each object 53 such that the total width SW corresponds to the width PW). The CPU 12 arranges objects 53 having modified width W in the print area 46 in the width direction such that each object is not overlapped with each other. Thus, the plurality of objects 53 are arranged in accordance with the fixed width PW of the print area 46, thereby the occurrence of feeling of strangeness or becoming worse may be reduced.

In a case where the total width SW is less than the width PW of the print area 46, the CPU 12 expands the width W of object area 54 of each text object uniformly while font size of text is maintained. Thus, only a margin area between each character is expanded in the print area 46, thereby maintaining the appearance of text.

In a case where the total width SW is greater than the width PW, the CPU 12 reduces width W of object area 54 of each object 53 such that a ratio of width of one object to width of another object is maintained. Thus, each object 53 may be arranged in the print area 46 in the width direction such that the ratio of width W of one object 53 to width W of another object 53 in the width direction is maintained, thereby the appearance of the objects may be maintained.

The CPU 12 may decrease font size of text based on the reduction amount ΔWd. Thus, the entire image of character string of text is properly displayed.

The CPU 12 may increase font size of text based on the expansion amount ΔWi as long as the expanded font size does not exceed its initial font size. Increasing font size to its initial font size may maintain the appearance of corresponding object.

Modification of the First Embodiment

A text object having setting of "justification" may be excluded from the target object whose width W may be expanded. The setting of "justification" allows each first character and last character in a character string to be justified to each end of an object area and also allows a space between each character to be set uniformly.

If width W of the text object having setting of "justification" is expanded while font size is maintained, the setting of "justification" may not be maintained.

In this modification, the CPU 12 specifies the target number N indicating the number of text objects other than the text object having setting of "justification", and calculates the expansion amount ΔWi to each target object. In S23 of FIG. 6, the CPU 12 expands width of each target object by using calculated expansion amount ΔWi. Nevertheless, if a text object having setting of "justification" has a smaller font size than its initial size, the CPU 12 may expand the width W of the text object having setting of "justification".

According to this modification, the text object having setting of "justification" may be arranged in accordance with user setting.

Second Embodiment

Hereinafter, a second embodiment will be described, focusing on the configurations different from the first embodiment. In the second embodiment, the same elements as those in the first embodiment are referred with the same reference characters, and a description thereof may be omitted.

Figure 9:
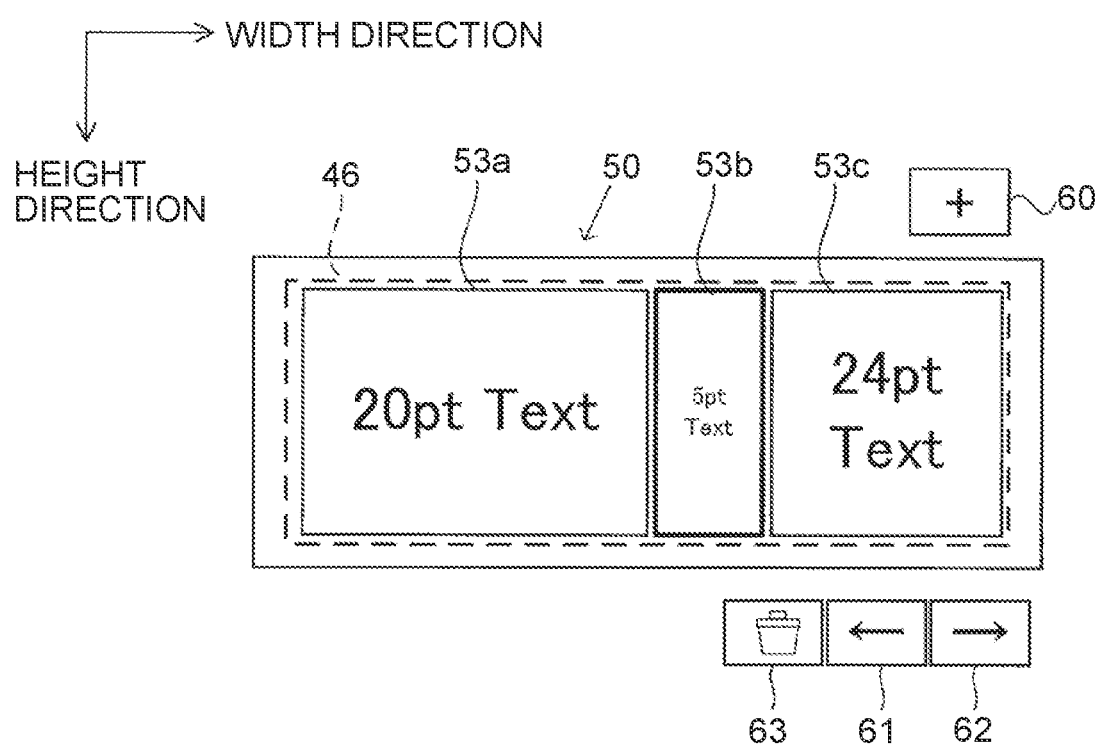
FIG. 9 is a diagram illustrating a print image according to a second embodiment.

In this embodiment, the CPU 12 may arrange a plurality of objects 53 in both of the height direction and the width direction. Similar to the first embodiment, the CPU 12 arranges a new object 53 in the print area 46 in response to receiving an operation of the addition icon 60. In the case of FIG. 9, three objects 53a, 53b and 53c are arranged in the print area 46 in the width direction.

Figure 10:
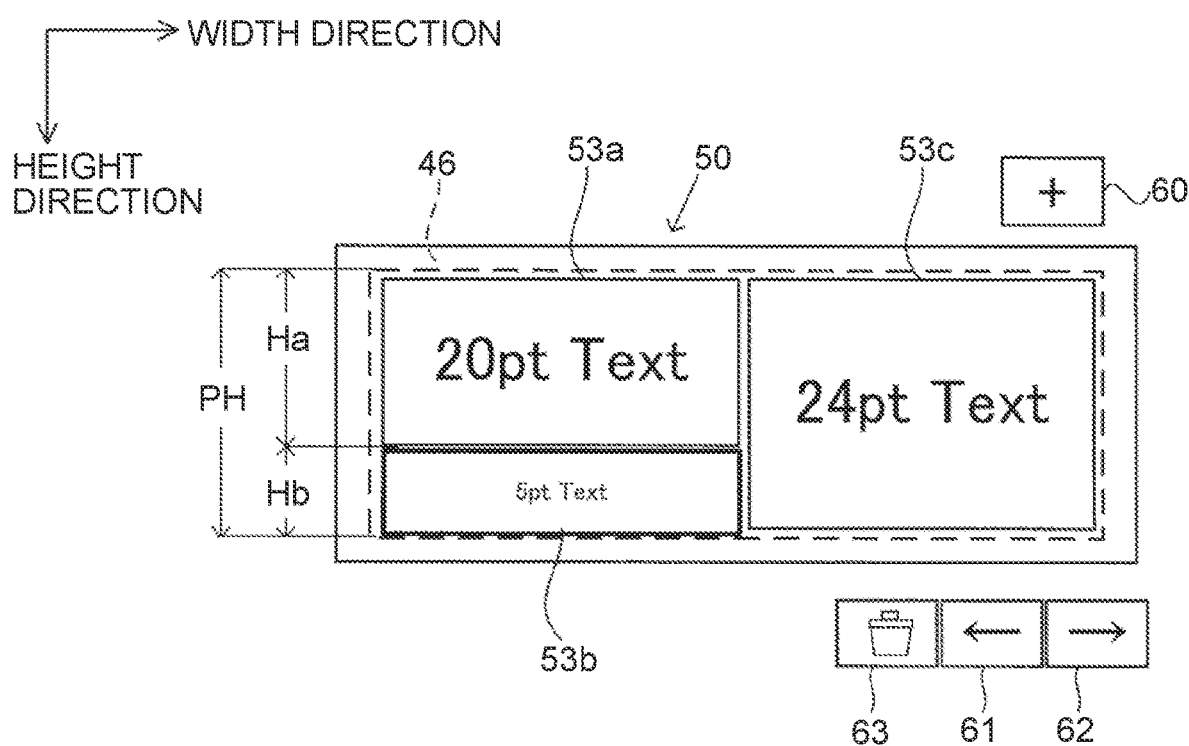
FIG. 10 is a diagram illustrating a print image.

In response to receiving an operation of moving icon 61 in a state where a target object 53 is selected, the CPU 12 changes an arrangement direction of the selected target object 53 from the width direction to the height direction. In the case of FIG. 9, in response to receiving the operation of moving icon 61 in a state where the object 53b as the target object is selected, the object 53b is moved to a position below the object 53a in the print area 46 as illustrated in FIG. 10. In response to receiving the operation of the moving icon 62 in a state where the object 53b, which is currently below the object 53a, is selected, the object 53b moves to an original position (i.e., right of the object 53a).

Figure 11:
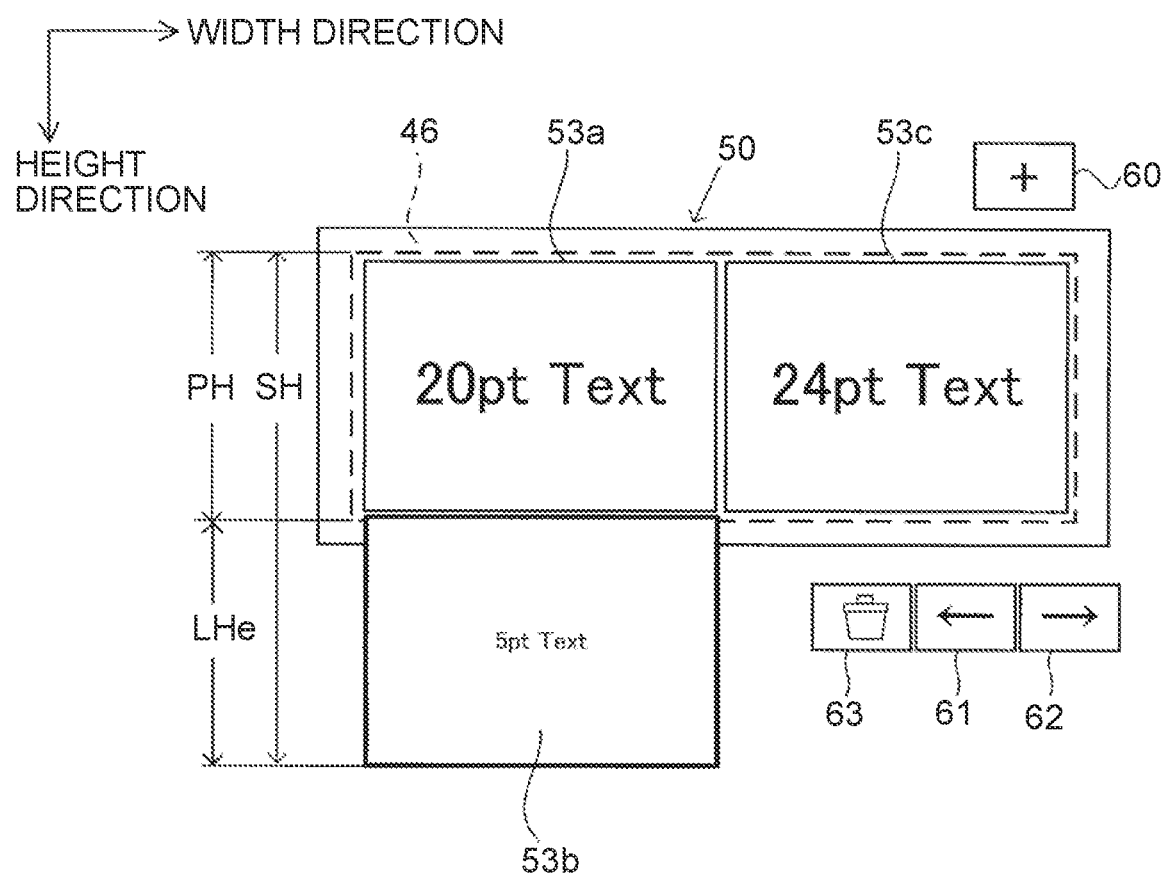
FIG. 11 is a diagram illustrating a print image.

Each object 53 has a height H identical to the height PH of the print area 46. If one object 53 is moved to a position below another object 53, a part of the moved object 53 may not be disposed in the print area 46. As illustrated in FIG. 11, a total height SH which is sum of height of each object 53a and 53b is greater than a height PH of the print area 46, thereby a part of the object 53b is beyond the print area 46 in the height direction. Thus, the CPU 12 reduces the height H of each object 53 in accordance with the height PH of the print area 46 in a case where a plurality of objects 53 are arranged in the height direction (i.e., a case where a plurality of objects 53 area arranged in the same column).

Figure 12:
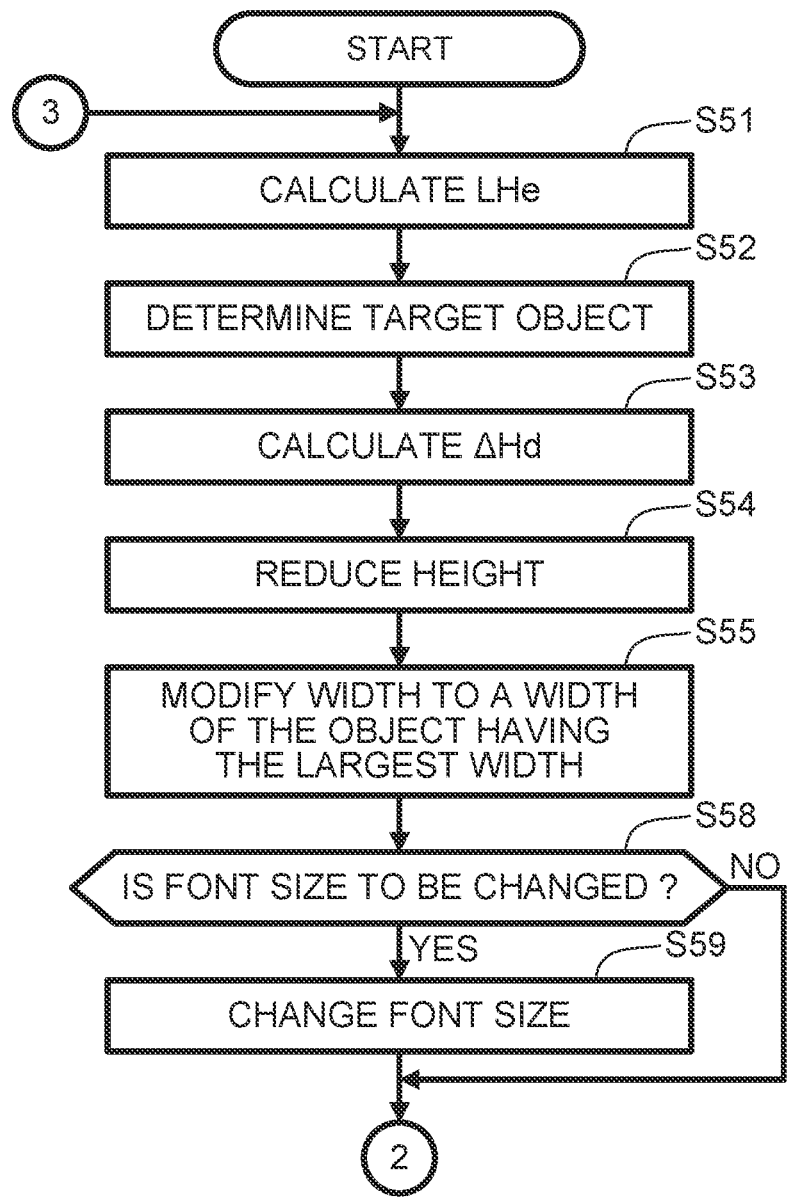
FIG. 12 is a flowchart illustrating steps of arranging a plurality of objects in a print area.

Referring to FIG. 12, a process for arranging objects 53 in the print area 46 will be described. Processes of FIG. 12 starts in response to receiving the operation of the moving icon 61 in a state where a plurality of objects 53 are arranged in the width direction and a target object which is to be moved is selected.

In S51, the CPU 12 calculates a height LHe of the object 53. As illustrated in FIG. 11, the height LHe represents a height of object 53b which is not disposed in the print area 46 in the height direction. In this embodiment, the height LHe is calculated by subtracting the height PH from the total height SH (i.e., SH−PH). In the case of FIG. 11, the height LHe is calculated by subtracting height of object 53a from sum of height of object 53a and 53b.

In S52, the CPU 12 determines a target object having a height to be modified. The target object is determined among the objects 53 arranged in the same column in the print area 46. In this embodiment, a text object is determined as the target object. In the case of FIG. 11, the object 53a and 53b are determined as the target object. Nevertheless, a text object having character string arranged in the height direction and having setting of "justification" may be excluded from the target object.

In S53, the CPU 12 calculates a reduction amount ΔHd. The CPU 12 calculates the reduction amount ΔHd in accordance with the height LHe, and a ratio of font size of the target object (i.e., the object 53a and the object 53b) to font size of another object arranged in the same column. In this embodiment, the reduction amount ΔHd is calculated by the following calculation equation (2).

$$\Delta Hd(n) = LHe \times FSn/(\Sigma FSn) \quad (2)$$

FS represents a font height defined based on the font size of the target object. Σ FSn represents sum of the font height of each target object forming the print image 50.

In S54, the CPU 12 reduces a height H of each target object (i.e., the object 53a and the object 53b) by using the reduction amount ΔHd calculated in S53. The height H of each target object is calculated by subtracting ΔHd from an initial height H of the target object (i.e., H−ΔHd).

In S55, the CPU 12 modifies a width W of each object 53 arranged in the same column to a width W of an object having the largest width in the same column. As illustrated in FIG. 10, the width W of the object 53b is modified to the width of the object 53a.

In S58, in a case where the object 53 is a text object, the CPU 12 determines whether font size of the text object is to be changed in accordance with modification of either of the width W or the height H of the text object. In the case of FIGS. 10 and 11, the object 53a and the object 53b each of which is the text object are determined whether font size thereof is to be changed. More specifically, the CPU 12 determines that the font size is to be changed in a following cases: a first case where the modified height H of the text object is less than a height H in which character string is to be arranged with font height defined by a current font size; or a second case where the modified width W of the text object is less than a width W in which character string is to be arranged with font width defined by a current font size.

In a case where it is determined that the font size of the text object is to be changed (YES in S58), in S59, the CPU 12 changes the font size of the text object. Then, the CPU 12 proceeds to S13 of FIG. 6. In a case where it is determined that the font size of the text object is not to be changed (NO in S58), the CPU 12 proceeds to S13 of FIG. 6. The CPU 12 rearranges each object 53 (i.e., the object 53a, the object 53b, and the object 53c) in accordance with the modified width W or height H.

In this embodiment, in response to execution of processes illustrated in FIG. 12, the CPU 12 rearranges the objects 53 in the width direction illustrated in FIG. 6. As illustrated in FIGS. 9 and 10, after the objects 53a and 53b are arranged in the height direction, a pair of the objects 53a and 53b, and the object 53c are rearranged in the width direction. In response to a new object 53 is added to the right side of existing objects 53 arranged in the height direction, the width W of each object 53 is modified in accordance with the width PW of the print area 46. The width W of each object 53 arranged in the same column are modified to be identical with each other. This modification uses the reduction amount ΔWd calculated in S17 or the expansion amount ΔWi calculated in S22.

According to this embodiment, following effects may be obtained. The CPU 12 modified the height H of each object 53 arranged in the height direction (i.e., each object 53 arranged in the same column) such that a ratio of font size of text in one object 53 to other objects 53 before modifying is identical to a ratio of font size of text in one object 53 to other objects 53 after modifying. The CPU 12 arranges the objects 53 in the height direction such that each object 53 is not overlapped with each other. Thus, the entire character string of the objects 53 is properly displayed and appears in the height PH.

The CPU 12 modifies the width W of each object 53 arranged in the same column to a width W of the object 53 having the largest width in the same column. Thus, the occurrence of feeling of strangeness due to variations of width W of each object 53 may be suppressed.

The CPU 12 displays, on the display 13, moving icons 61 and 62 causing the object 53 to change its arrangement direction. The CPU 12 changes the arrangement direction between the width direction and the height direction in response to user's operation of the moving icons 61 and 62. The moving icons 61 and 62 on the display 13 may enhance user's operation.

Modification of the Second Embodiment

In a case where the object 53 arranged in the height direction includes setting of "justification", the CPU 12 may not necessarily expand the width W of the object 53 arranged in the height direction. In this modification, the CPU 12 may exclude a text object having the setting of "justification" from the target object (i.e., the number of text objects having the setting of "justification" may not necessarily be counted as the target number N) in S41 of FIG. 8 after execution of processes of FIG. 12.

In this modification, the width W of text object having the setting of "justification" is not modified. Thus, the occurrence of feeling of strangeness may be suppressed while the configuration of the text object having the setting of "justification" is maintained.

Third Embodiment

Hereinafter, a third embodiment will be described, focusing on the configuration different from the second embodiment. In the third embodiment, the same elements as those in the second embodiment are referred with the same reference characters, and a description thereof may be omitted.

As described above, a user may change font size of a text object. In this embodiment, the CPU 12 modifies a size (i.e., width W or height H) of a text object having a changed font size by a user such that the changed font size is maintained. The CPU 12 modifies a size (i.e., width W or height H) of a text object without modifying the changed font size such that sum of the width W of each object 53 is identical to the width PW of the print area 46, and sum of the height H of each object 53 is identical to the height PH of the print area 46. This configuration may satisfy user's intention that the changed font size by the user is to be maintained.

Figure 13:
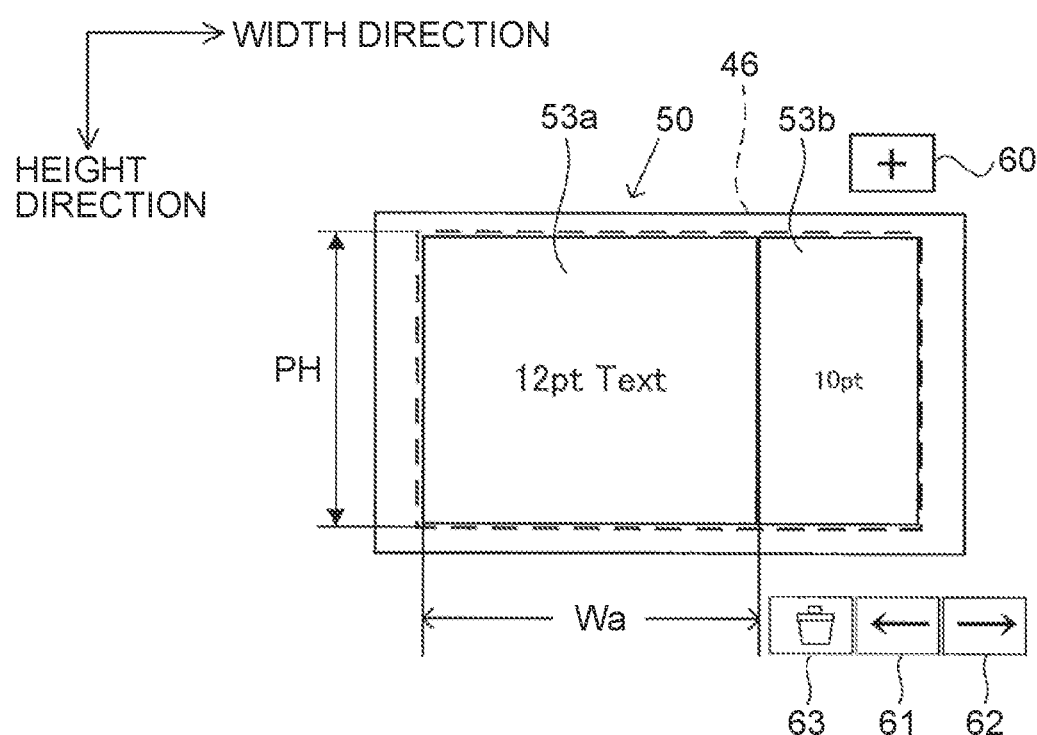
FIG. 13 is a diagram illustrating a print image according to a third embodiment.
Figure 14:
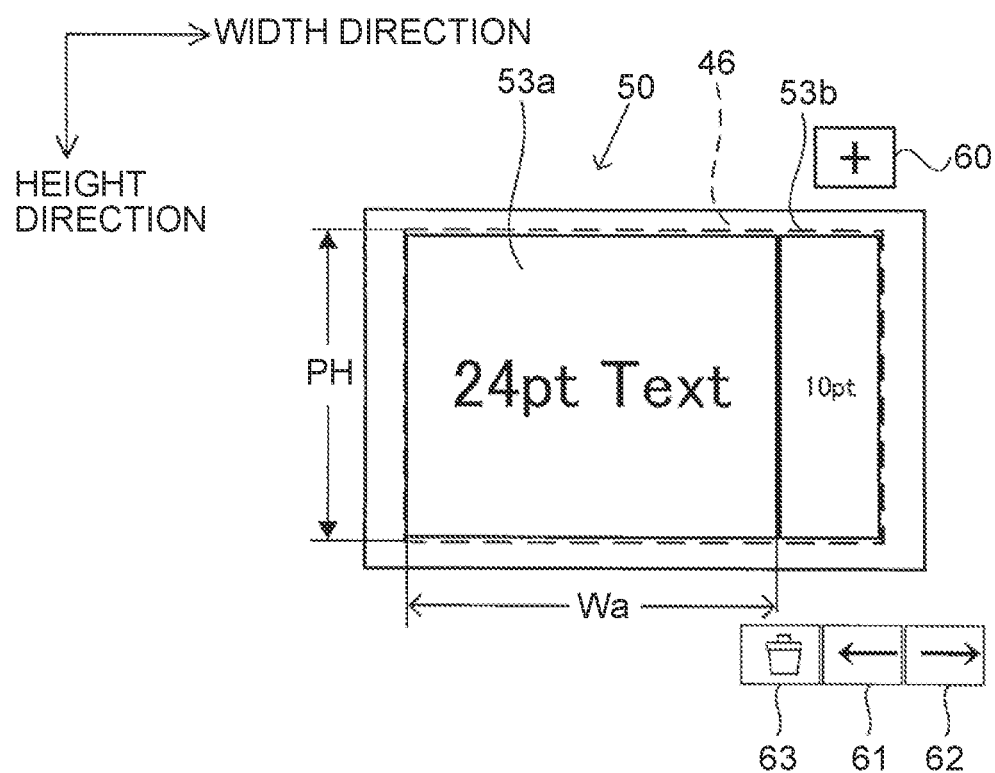
FIG. 14 is a diagram illustrating a print image when font size of object is changed.

In FIG. 13, two objects 53a and 53b are arranged in the width direction in the print area 46. FIG. 14 illustrates a first example of modification in this embodiment. As illustrated in FIGS. 13 and 14, a width Wa of the object 53a is expanded suitable for the font size of 24 point in response to receiving a user's instruction for expanding the font size of the text from 12 point to 24 point. In FIG. 14, the content 55 of "24 pt Text" of the object 53a represents that the font size of text is 24 point. Expansion of the width Wa causes the width W of the object 53b to modify such that sum of the total width SW of object 53a and object 53b is identical to the total width PW of the print area 46.

Figure 15:
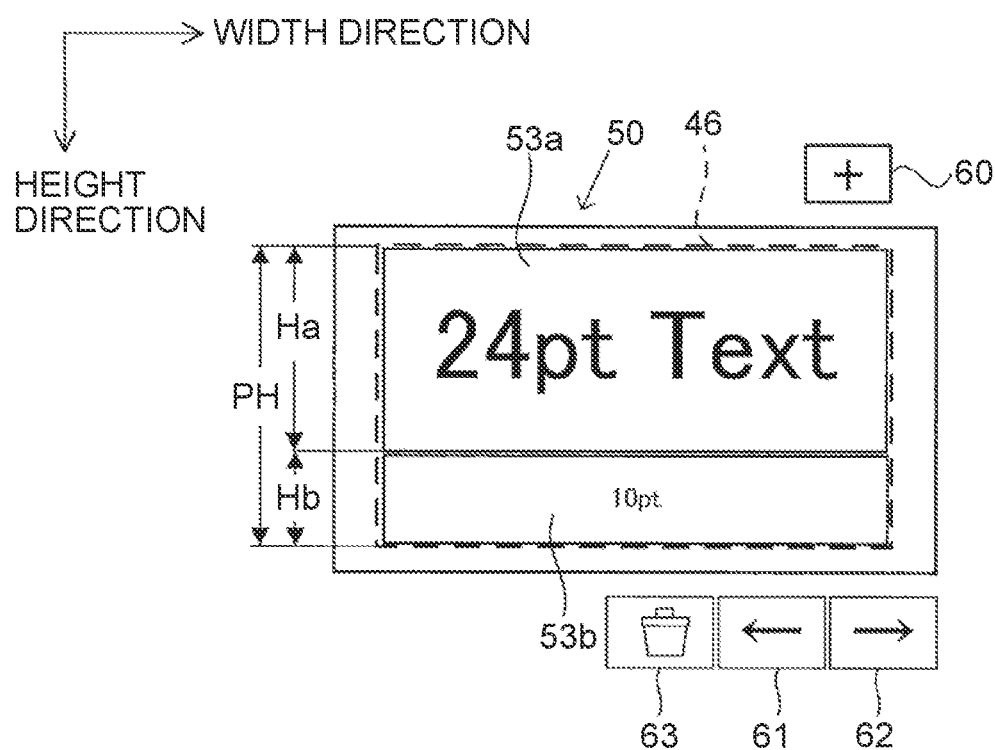
FIG. 15 is a diagram illustrating a print image when font size of object is changed.

FIG. 15 illustrates a second example of modification in this embodiment. As illustrated in FIGS. 13 and 15, the object 53b is moved to a position below the object 53a in the print area 46 in response to receiving instructions of a user's operation through moving icon 61 in a state where the object 53b is selected. After the object 53b is moved, font size of the object 53a is changed from 12 point to 24 point. Then, as illustrated in FIG. 15, a height Ha of the object 53a is modified, from the height PH, suitable for the font size of 24 point. Modifying the height Ha causes the height Hb of the object 53b to be modified such that the total height SH of the object 53a and the object 53b is identical to the height PH of the print area 46.

Figure 16:
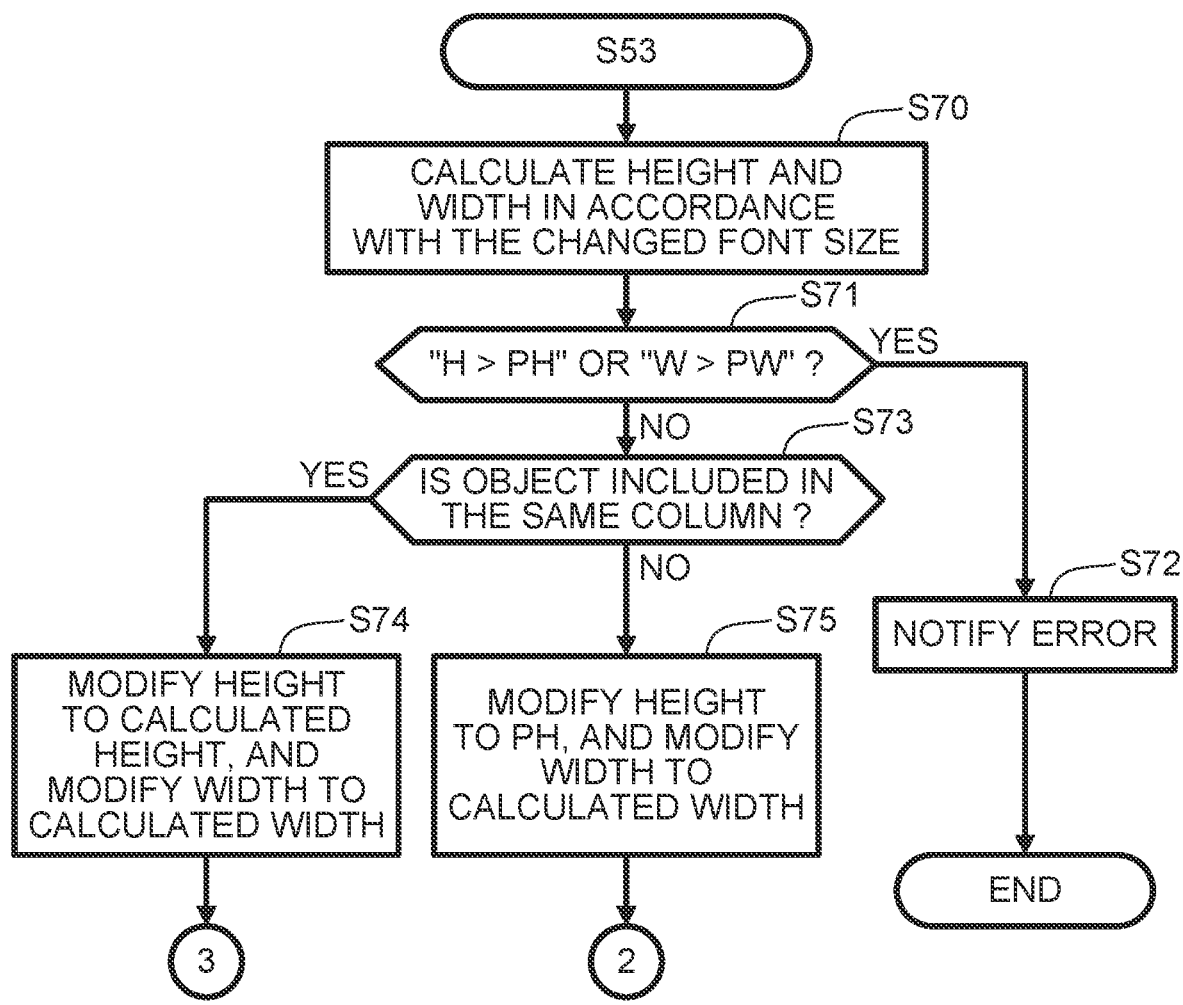
FIG. 16 is a flowchart illustrating processes executed in step S53 of FIG. 12.

Referring to FIG. 16, a process for arranging objects 53 in the print area 46 will be described. Processes of FIG. 16 starts in response to receiving user's instruction for changing font size of a certain object 53 in the print area 46.

In S70, the CPU 12 calculates each of a height H and a width W of the certain object 53 in accordance with the changed font size.

In S71, the CPU 12 determines whether (1) the calculated height H is greater than PH of the print area 46 or (2) the calculated width W is greater than PW of the print area 46.

In a case where it is determined that either of the condition (1) or (2) is satisfied (YES in S70), in S72, the CPU 12 notifies an error. The notification may include, by displaying on the display 13, that the certain object 53 is not to be disposed in the print area 46 due to the large font size. In response to execution of S72, the processes of FIG. 16 is terminated.

In a case where it is determined that neither of the condition (1) nor (2) is satisfied (NO in S70), in S73, the CPU 12 determines whether at least one object other than the certain object 53 having the changed font size is included in the same column. As illustrated in FIG. 15, except for the object 53a having the changed font size, the object 53b is included in the same column. In this case, the object 53a is an example of the certain object 53. In a case where it is determined that the at least one object is included in the same column as the certain object 53 (YES in S73), in S74, the CPU 12 modifies the height H of the certain object 53 to the height H calculated in S70, and modifies the width W of the certain object 53 to the width W calculated in S70. Then, the CPU 12 proceeds to S51 of FIG. 12.

In S51 of FIG. 12, the CPU 12 calculates a height LHe. The height LHe is calculated by subtracting total height SH of the objects 53a and 54b from the height PH of the print area 46 (i.e., PH−SH). In S52, the CPU 12 determines a target object having unchanged font size. In this embodiment, the object 53b is determined as the target object.

In S53, the CPU 12 calculates a reduction amount ΔHd indicating a reduction amount of the height H of the target object. In this embodiment, the target object only includes the object 53b, thereby the reduction amount ΔHd is calculated as the LHe.

In S54, the CPU 12 determines the modified height H of the target object. The height H of the target object is determined by subtracting ΔHd from the height H of the target object. Following processes are the same as those of the second embodiment.

In a case where it is determined that, except for the certain object 53, none of the object is included in the same column (NO in S73), in S75, the CPU 12 modifies the height H of the certain object 53 to the height PH of the print area 46, and modifies the width W of the certain object 53 to the width W calculated in S70. As illustrated in FIG. 14, except for the object 53a having the changed font size, none of the object is included in the same column. Then, the CPU 12 proceeds to S13 of FIG. 12. After the processes of S13, text object having unchanged font size is determined as the target object. Each size (i.e., width W and height H) of the target object is modified such that all objects 53 is disposed in the print area 46 while size of the certain object having changed font size is not modified.

According to this embodiment, a plurality of objects 53 may be arranged in the print area 46 in accordance with user setting. In this embodiment, a case where font size of the object 53 is increased is described. Alternatively, a case where font size of the object 53 is decreased may be applied.

Modification

The present invention is not limited to the embodiment described above, and various changes, arrangements and modifications may be applied therein.

A text object in which a character string is arranged in the height direction, instead of the width direction, may be applied.

The printer may print on not only a label but also a different print medium (e.g., a print medium having a size of A4 or A5).

The print area 46 may include one dimension (e.g., width) in which a size is fixed, and another dimension (e.g., height) in which a size is not fixed.

A size (e.g., a width W or a height H) of an object other than a text object may be modified.

The processes disclosed in the specification may be implemented by single CPU, multiple CPUs, hardware (e.g., ASIC) or a combination thereof.

What is claimed is:

1. A non-transitory computer-readable recording medium storing instructions, wherein the instructions, when executed by a computer of an information processing apparatus, cause the information processing apparatus to perform operations comprising:
   displaying a preview screen that indicates a print media having a certain width in a first direction;
   receiving a first input for designating a first object, the first object having a first object width in the first direction;
   disposing the first object in the preview screen;
   receiving a second input for designating a second object, the second object having a second object width in the first direction;
   comparing the second object width with a difference between the certain width and the first object width; and;
   in response to the comparing, modifying each of the first object and the second object such that sum of the first object width and the second object width corresponds to the certain width;
   wherein the comparing includes determining whether the certain width is less than the sum of the first object width and the second object width, and
   wherein, in a case where it is determined that the certain width is not less than the sum of the first object width and the second object width, the modifying includes expanding each of the first object width and the second object width in the first direction;
   wherein each type of the first object and the second object is a text object,
   wherein the instructions further cause the information processing apparatus to perform operations comprising:
      receiving, for each of the first object and the second object, a character setting,
   wherein, in a case where the character setting includes justification setting which allows each first character and a last character in a character string to be justified to each end of an object area, and allows a space between each character to be set uniformly, a width of corresponding object in the first direction is not expanded, and
   wherein, in a case where the character setting does not include the justification setting, the width of corresponding object in the first direction is expanded.

2. The non-transitory computer-readable recording medium according to claim 1,
   wherein each type of the first object and the second object is a text object, and
   wherein, in a case where the first object width and the second object width are expanded, font size of text in each of the first object and the second object is maintained.

3. The non-transitory computer-readable recording medium according to claim 1,
   wherein the comparing includes determining whether the certain width is less than the sum of the first object width and the second object width, and
   wherein, in a case where it is determined that the certain width is less than the sum of the first object width and the second object width, the modifying includes reducing each of the first object width and the second object width such that a ratio of the first object width to the second object width is maintained.

4. The non-transitory computer-readable recording medium according to claim 3, wherein a ratio of the first object width to the second object width before the modifying is identical to a ratio of the first object width to the second object width after the modifying.

5. The non-transitory computer-readable recording medium according to claim 3,
   wherein each type of the first object and the second object is a text object, and
   wherein the modifying includes decreasing font size of the text in accordance with a width of corresponding object in the first direction.

6. An information processing apparatus comprising:
   a display;
   a communication interface; and
   a controller configured to perform:
   displaying a preview screen that indicates a print media having a certain width in a first direction;
   receiving a first input for designating a first object, the first object having a first object width in the first direction;
   disposing the first object in the preview screen;
   receiving a second input for designating a second object, the second object having a second object width in the first direction;
   comparing the second object width with a difference between the certain width and the first object width; and;
   in response to the comparing, modifying each of the first object and the second object such that sum of the first object width and the second object width corresponds to the certain width;
   wherein the comparing includes determining whether the certain width is less than the sum of the first object width and the second object width, and
   wherein, in a case where it is determined that the certain width is not less than the sum of the first object width and the second object width, the modifying includes expanding each of the first object width and the second object width in the first direction;
   wherein each type of the first object and the second object is a text object,
   wherein the instructions further cause the information processing apparatus to perform operations comprising:
      receiving, for each of the first object and the second object, a character setting,
   wherein, in a case where the character setting includes justification setting which allows each first character and a last character in a character string to be justified to each end of an object area, and allows a space between each character to be set uniformly, a width of corresponding object in the first direction is not expanded, and
   wherein, in a case where the character setting does not include the justification setting, the width of corresponding object in the first direction is expanded.

7. A non-transitory computer-readable recording medium storing instructions, wherein the instructions, when executed by a computer of an information processing apparatus, cause the information processing apparatus to perform operations comprising:

displaying a preview screen that indicates a print media having a certain width in a first direction and a certain height in a second direction different from the first direction;

receiving a first input for designating a first text object, the first text object having a first font size, a first object width in the first direction and a first object height in the second direction;

receiving a second input for designating a second text object, the second text object having a second font size, a second object width in the first direction and a second object height in the second direction;

modifying at least one of the first object or the second object, such that sum of the first object height and the second object height corresponds to the certain height, and such that a ratio of the first font size to the second font size before modifying is identical to a ratio of the first font size to the second font size after modifying; and disposing, after the modifying, the first text object and the second text object in the second direction in the preview screen;

wherein each of the first text object and the second text object further includes a justification setting, and wherein each of the first object width and the second object width is not modified.

8. The non-transitory computer-readable recording medium according to claim 7, wherein, before the modifying, the first object width is less than the second object width, and wherein, after the modifying, the first object width is identical to the second object width.

9. The non-transitory computer-readable recording medium according to claim 7, wherein the instructions further cause the information processing apparatus to perform operations comprising:

displaying a moving icon for causing movement of the first text object; and in response to receiving an instruction through the moving icon in a state where the first object and the second object are arranged in the second direction, arranging the first text object and the second text object in the first direction.

10. The non-transitory computer-readable recording medium according to claim 1, wherein the first object is a text object, and the second object is a text object, wherein the instructions further cause the information processing apparatus to perform operations comprising:

receiving an instruction for changing font size of the first object, wherein the modifying includes:

modifying the first object width in accordance with the changed font size; and modifying the second object width such that sum of the modified first object width and the modified second object width corresponds to the certain width.

11. An information processing apparatus comprising:

a display;

a communication interface; and a controller configured to perform:

displaying a preview screen that indicates a print media having a certain width in a first direction and a certain height in a second direction different from the first direction;

receiving a first input for designating a first text object, the first text object having a first font size, a first object width in the first direction and a first object height in the second direction;

receiving a second input for designating a second text object, the second text object having a second font size, a second object width in the first direction and a second object height in the second direction;

modifying at least one of the first object or the second object, such that sum of the first object height and the second object height corresponds to the certain height, and such that a ratio of the first font size to the second font size before modifying is identical to a ratio of the first font size to the second font size after modifying; and disposing, after the modifying, the first text object and the second text object in the second direction in the preview screen;

wherein each of the first text object and the second text object further includes a justification setting, and wherein each of the first object width and the second object width is not modified.

* * * * *